J. W. BINGLEY.
SAFETY VALVE FOR AIR BRAKE APPARATUS.
APPLICATION FILED MAR. 7, 1914.
1,124,203. Patented Jan. 5, 1915.
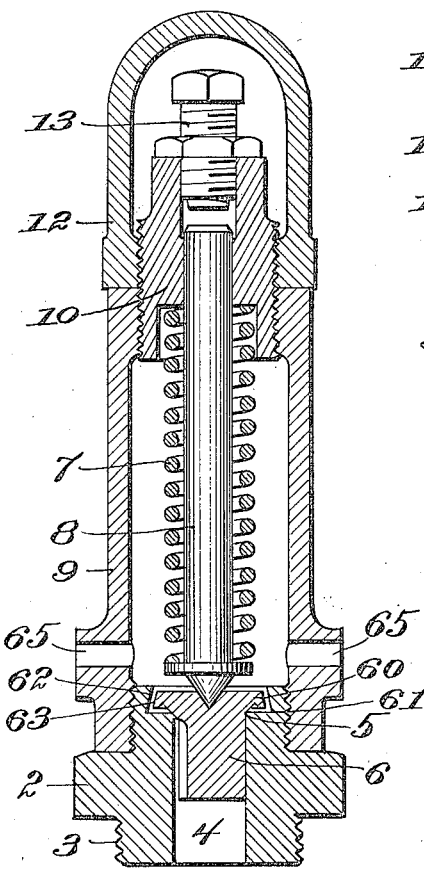
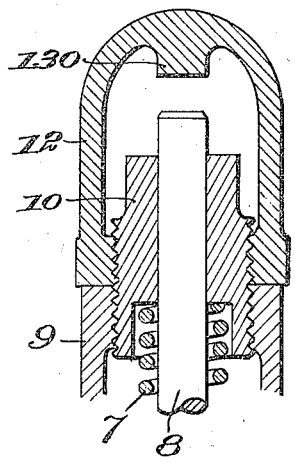
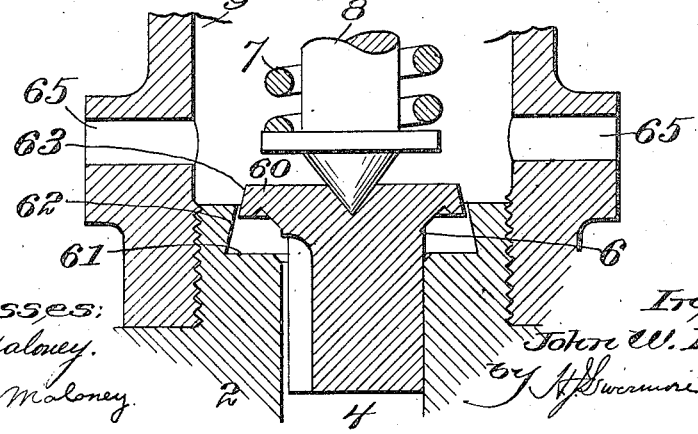
Witnesses:
Jas. J. Maloney.
Mary L. Maloney.
Inventor,
John W. Bingley,
by H. Swinmore
Atty.

UNITED STATES PATENT OFFICE.

JOHN W. BINGLEY, OF WATERTOWN, NEW YORK, ASSIGNOR TO NEW YORK AIR BRAKE COMPANY, A CORPORATION OF NEW JERSEY.

SAFETY-VALVE FOR AIR-BRAKE APPARATUS.

1,124,203. Specification of Letters Patent. Patented Jan. 5, 1915.

Application filed March 7, 1914. Serial No. 823,049.

*To all whom it may concern:*

Be it known that I, JOHN W. BINGLEY, a citizen of the United States, residing in Watertown, in the county of Jefferson and State of New York, have invented an Improvement in Safety-Valves for Air-Brake Apparatus, of which the following description, in connection with the accompanying drawings, is a specification, like letters on the drawings representing like parts.

This invention relates to a safety valve or relief valve suitable for use in connection with the brake cylinder of an air brake apparatus for preventing excessive pressure in the brake cylinder such as might result in the locking of the car wheels and wearing flat surfaces thereon.

Owing to the variations in the travel of the piston in the brake cylinder of an air brake apparatus and for other reasons there is liability of a greater pressure being produced in the brake cylinder than the maximum under which the brakes are designed to operate in making service applications and this may result in the locking of the wheels on some of the cars of the train and the wearing of flat surfaces on the wheel treads which is highly objectionable.

Modern air brake equipments are in some cases provided with relief valves for preventing such excess of pressure in the brake cylinders and the present invention consists mainly in certain features of construction of such a relief valve by which the valve is caused to open promptly and with ample capacity when the pressure rises to the point which is not to be exceeded, and said valve remains open until the pressure has fallen materially below that which caused its opening, and thereupon is closed promptly and tightly.

Figure 1 is a longitudinal section of a relief valve embodying the invention in its normal or closed position; Fig. 2 is an enlarged section of a portion of said valve with the valve proper in opened or unseated position; and Fig. 3 is a sectional detail showing a modified construction.

The base or seat piece 2 is adapted to be connected with the space containing the pressure to be controlled, and is shown as having a screw threaded neck 3 for attachment to the piping or to any suitable part of the wall of the chamber or space containing the pressure to be controlled. Said base piece 2 also contains the discharge passage 4 terminating in a valve seat 5 which coöperates with the valve proper 6 which has a grooved guide stem working in the passage 4. The said valve is normally held seated by the force of the spring 7 one end of which engages a shoulder or flange on a stem 8 the lower end of which is made conical and has a central bearing upon the valve 6. The said spring 7 is contained in a spring chamber 9 rigidly secured to the base 2 and serving to support or connect with the said base the spring abutment 10 which is connected with the upper end of the spring chamber 9 by a screw thread so that it may be adjusted toward or from the base piece to vary the force of the spring 7 and thus determine the pressure required in the passage 4 to lift or unseat the valve. A cap nut 12 which screws on to the spring adjusting nut 10 serves as a lock nut to prevent derangement of the adjustment and also to inclose and make a finish for the parts projecting from the spring chamber.

As shown in Fig. 1 the spring-adjusting nut 10 has adjustably mounted therein a stop 13 for the valve holding stem 8 which stop thus positively and definitely limits the rise of the valve when unseated by the action of a pressure in the passage 4 sufficient to overcome the force of the spring 7.

In the modification shown in Fig. 3 the stop 130 for the valve stem 8 is made integral with the cap nut 12 and is not adjustable. In this construction it will be seen that the change of position of the spring nut 10 for adjusting the force of the spring 7 does not vary the position of the stop 130 relative to the stem 8 so that said stop affords the same limit for the rise of the valve with all adjustments of the spring pressure.

The valve 6 has an outwardly extended flange or enlargement 60 surrounding the portion that engages the seat, and the base piece 2 containing the valve seat has a depression surrounding the seat and containing the valve enlargement 60 when the valve is seated. The floor 61 of said depression lies beneath the enlargement 60 of the valve 6 as best shown in Fig. 1, and said enlargement of the valve affords an additional area subjected to the pressure of the escaping fluid when the pressure in the passage 4 is sufficient to lift the valve 6 from its seat, thus giving an increase in lifting pressure over that which is sufficient to unseat the valve and thus serving to move the valve promptly and somewhat extensively against the pressure of the spring 7 as is well understood, such additional valve lifting force being exhibited in the operation of the well known pop safety valves.

In the present construction the side wall of the recess around the valve seat is made higher than the thickness of the enlargement 60 of the valve, and is tapered as shown at 62, being smaller at the end remote from the floor 61 than where the said wall intersects the said floor of the cavity surrounding the valve seat.

The outer periphery of the enlargement 60 of the valve is correspondingly tapered as shown at 63 and is preferably of such size that the largest part of the periphery of the valve will just pass through the opening at the top of the cavity in the valve seat.
By this construction it will be seen that an annular passage is afforded for the escape of the fluid between the periphery 63 of the enlargement of the valve and the side wall 62 of the cavity around the valve seat, and that the effective area of this annular opening decreases as the valve rises and would be practically closed if the valve were permitted to rise until the lower end of its enlargement coincided with the upper end of the side wall of the cavity. The amount of this upward movement of the valve is determined by locating or adjusting the stop 130 or 13 to arrest the valve in its rising or opening movement at any desired point, with the lower edge of the enlargement 60 below the upper edge of the side wall 62, and the annular discharge opening between the tapered surfaces 62, 63, may thus be made of any desired width and effective area and may therefore be made to restrict the discharge of the fluid more or less and thereby to retain more or less pressure in the cavity surrounding the valve seat under the enlargement of the valve in addition to that in the passage 4, so that the valve may be held unseated until the pressure has been lowered the desired amount below that which is sufficient to unseat the valve. As soon, however, as the total pressure under the valve and its enlargement becomes insufficient to overcome the force of the spring 7 the latter begins to move the valve toward its seat and in so doing enlarges the annular opening between the surfaces 62, 63, and thereby effects a reduction of the pressure in the recess below the enlargement of the valve so that the spring, notwithstanding the fact that it is expanding and losing force in this movement of the valve toward its seat promptly overcomes the opposing fluid pressure and causes the valve to close promptly and seat tightly as soon as the desired reduction in pressure has been obtained.

The spring chamber has one or more discharge openings 65 of proper capacity to discharge the fluid after it has passed the valve without causing objectionable pressure to be produced in the spring chamber over the valve.

What I claim is:

1. The combination of the valve seat, valve, and means for yieldingly holding the valve pressed to its seat, said valve being provided with an enlargement around its seating portion affording an additional area adapted to be exposed to fluid pressure when the valve is unseated and the valve seat being provided with a recess containing said enlargement; the walls of said enlargement and recess being convergent in the direction of movement of the valve in unseating and thereby affording a passage between them the effective area of which is reduced as the distance to which the valve is moved from its seat increases substantially as described.

2. The combination of the valve seat, valve, and means for yieldingly holding the valve pressed to its seat, said valve being provided with an enlargement around its seating portion affording an additional area adapted to be exposed to fluid pressure when the valve is unseated and the valve seat being provided with a recess containing said enlargement; the walls of said enlargement and recess being convergent in the direction of movement of the valve in unseating and thereby affording a passage the effective area of which is reduced as the distance to which the valve is moved from its seat increases, and a stop for determining the distance to which the valve is moved when unseated by fluid pressure.

3. The combination of the base provided with a discharge passage; a valve seat; and a recess around said valve seat, with a valve coöperating with said valve seat and having an enlargement contained in the said recess thereof affording an additional area adapted to be exposed to fluid pressure when the valve is unseated, said enlargement of the valve and recess in the valve seat being convergent in the direction of movement of the valve in unseating as described; a stem engaging said valve and a spring chamber connected with said base and spring abutment adjustably connected with said spring chamber, and a spring interposed between said spring abutment and said valve holding stem, and a stop coöperating with said stem for limiting the movement of the valve from its seat, substantially as and for the purpose described.

In testimony whereof, I have signed my name to this specification in the presence of two subscribing witnesses.

JOHN W. BINGLEY.

Witnesses:
WM. EDWARDS,
HAZEL HYNES.